> United States Patent Office

2,776,967
DIKETOPREGNANESPIROTHIAZOLIDINE

Gunther S. Fonken and John A. Hogg, Kalamazoo Township, Kalamazoo County, Mich., assignors to The Upjohn Company, Kalamazoo, Mich., a corporation of Michigan No Drawing. Application September 8, 1955,
Serial No. 533,236

7 Claims. (Cl. 260—239.5)

This invention relates to new organic compounds and is particularly directed to 11,20-diketopregnane-3-spiro(2-thiazolidine-4-carboxylic acid) either as the free acid or as a salt thereof and in both the 5β-(normal) and 5α-(allo) forms.

It is an object of the invention to provide novel physiologically active compounds. It is a further object to provide novel central nervous systems depressants useful as daytime sedatives or tranquilizing agents. It is a further object to provide novel compounds that are safe and effective for these purposes, are water soluble, and have a prolonged pharmacodynamic effect.

These and other objects are accomplished in the novel compounds of the invention which are represented by the following formula:

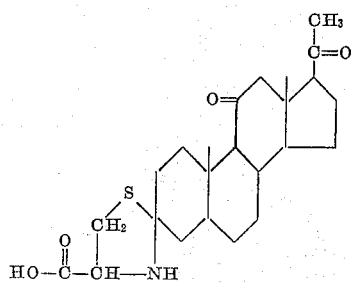

and which can exist and can be used for the purposes of the invention in either the 5β- or 5α-form and in the form of the free acid or salt thereof with a pharmacologically acceptable cation such as ammonium, sodium, potassium, lithium, and like alkali metal cations, calcium, strontium, and magnesium and like alkaline earth metal cations, and the cations of organic bases such as basic amines, as for example, mono-, di-, and trimethylamines, mono-, di-, and triethylamines, mono-, di-, and triisopropylamines, ethyldimethylamine, benzyldiethylamine, cyclohexylamine, dibenzylamine, and like N,N-dibenzylethylene diamine, bis-ortho-methoxy-N-methyl ortho-phenylisopropylamine, methoxyphenylisopropylamine, lower-aliphatic, lower-cycloaliphatic, and lower-aralphatic amines up to and including about eight carbon atoms; heterocyclic amines such as piperidine, morpholine, pyrrolidine, piperazine, and the lower-alkyl derivatives thereof, such as 1-methylpiperidine, 4-ethylmorpholine, 1-isopropylpyrrolidine, 1,4-dimethylpiperazine, 1-n-butylpiperidine, 2-methylpiperidine, 1-ethyl-2-methylpiperidine, mono-, di-, and triethanolamines, ethyldiethanolamine, n-butylmonoethanolamine, 2-amino-1-butanol, 2-amino-2-ethyl-1,3-propanediol, 2-amino-2-methyl-1-propanol, tris (hydroxymethyl) aminomethane, phenylmonoethanolamine, p-tertiaryamylphenyldiethanolamine, and galactamine, N-methyl glucamine, N-methyl glucosamine, ephedrine, phenylephrine, epinephrine, procaine, and the like.

The compounds of the invention are characterized by the water-solubilizing carboxyl or carboxylate groups linked to the 3-position of a pregnane-11,20-dione through a thiazolidine group. The normal compounds of the invention have the advantages over the parent steroid of water-solubility and more prolonged action. The prolonged action is a surprising and unexpected effect because the introduction of water-solubilizing groups in active steroids has been observed heretofore to speed up the desired pharmacodynamic action. The compounds of the invention, therefore, have entirely new and unforeseeable pharmacodynamic activity. For example, when equal doses (two milligrams) are administered intraperitoneally to rats, anesthesia is induced in two to five minutes with 5β-pregnane-3,11-20-trione and the animals sleep about thirty minutes whereas with 11,20-diketopregnane - 3 - spiro(2 - thiazolidine - 4 - carboxylic acid), sodium salt, no effect was observed for twenty to thirty minutes and the animals then went into a light sleep and slept for about two hours. The same relative effects were obtained when the two compounds were administered intravenously. The allo compounds of the invention have activity similar to the activity of the normal compounds of the invention which is entirely unexpected in view of the lack of activity in the parent compound, 5α-pregnane-3,11,20-trione.

The invention may be more fully understood by the following examples which are illustrative only and not to be construed as limiting.

Example 1. — 11,20 - diketo - 5β - pregnane - 3 - spiro(2-thiazolidine-4-carboxylic free acid)

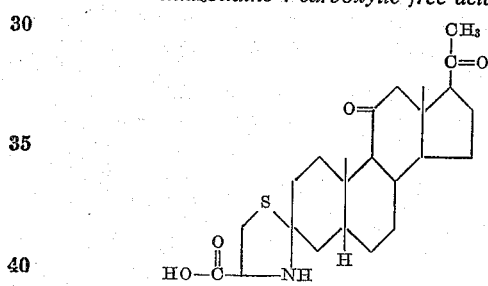

A solution of 4.39 grams (27.9 millimoles) of cysteine hydrochloride and 2.8 grams (about 28 millimoles) of potassium acetate in forty milliliters of water was diluted to eighty milliliters volume with 95 percent ethanol and added to a solution of nine grams (27.2 millimoles) of 5β-pregnane-3,11,20-trione in 350 milliliters of 95 percent ethanol. The mixture was stirred at room temperature overnight, then refluxed with stirring for about eight hours, allowed to stand overnight at room temperature and the product then recovered by filtration. After washing with water and drying the material in a vacuum oven at about fifty degrees centigrade there was obtained 7.3 grams of crude 11,20-diketo-5β-pregnane-3-spiro(2-thiazolidine-4-carboxylic free acid),, melting point 155–160 degrees centigrade with decomposition.

Example 2. — 11,20 - diketo - 5β - pregnane - 3 - spiro(2-thiazolidine-4-carboxylic acid), sodium salt

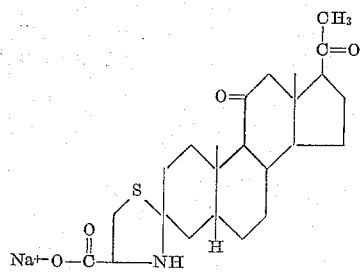

The free spiro acid (7.3 grams) of Example 1 was slurried in fifty milliliters of water and about 140 milliliters of one-tenth normal sodium hydroxide added with stirring, the course of the addition being followed with a pH meter, the electrodes of which were placed in the reaction mixture. Addition of alkali was stopped at pH 8.1. The cloudy solution was filtered through a bed of diatomaceous earth and then was lyophilized to give 7.1 grams (90 percent, based on unrecovered pregnane-3,11,20-trione) of the desired sodium salt. The infrared spectrum was consistent with the structure given above.

*Example 3. — 11,20 - diketo - 5α - pregnane - 3 - spiro(2-thiazolidine-4-carboxylic free acid*

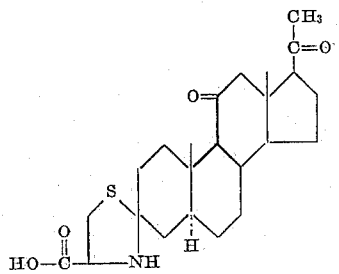

To a solution formed by heating 3.30 grams (ten millimoles) of 5α-pregnane-3,11, 20-trione in 100 milliliters of absolute ethanol to reflux with stirring, there was added 1.57 grams (ten millimoles) of cysteine hydrochloride and one gram (10+ millimoles) of anhydrous potassium acetate dissolved in fifteen milliliters of water and fifteen milliliters of ethanol. The reaction mixture thus prepared was then refluxed with stirring for twenty hours. A thick precipitate formed after five minutes. After cooling in an ice bath for several hours with stirring, filtering, triturating with water and drying in air, there was obtained 3.19 grams (73.8 percent of theory) of 11,20 - diketo - 5α - pregnane - 3 - spiro(2 - thiazolidine-4-carboxylic free acid.

*Example 4. — 11,20 - diketo - 5α - pregnane - 3 - spiro(2-thiazolidine-4-carboxylic acid), sodium salt*

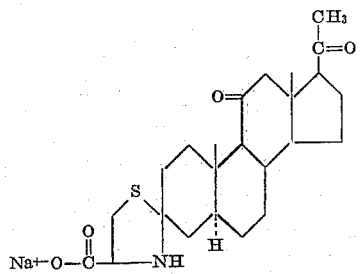

The free spiro acid (3.19 grams) of Example 3 was slurried in fifty milliliters of water and about 65 milliliters of one-tenth normal sodium hydroxide added with stirring. The pH rose to about 11. The cloudy solution was centrifuged to coagulate the gelatinous precipitate. The supernatant was decanted and the residue lyophilized to yield 2.6 grams of the desired sodium salt. The infrared spectrum was consistent with the structure given above.

In place of sodium hydroxide there may be substituted appropriate bases to obtain the potassium, lithium, ammonium, calcium, strontium, magnesium, basic amines such as mono-, di-, and trimethylamines, mono-, di-, and triethylamines, mono-, di-, and triisopropylamines, ethyldimethylamine, benzyldiethylamine, cyclohexylamine, dibenzylamine, and like N,N-dibenzylethylene diamine, bis-ortho-methoxy-N-methyl ortho-phenylisopropylamine, methoxyphenylisopropylamine, lower-aliphatic, lower-cycloaliphatic, and lower-araliphatic amines up to and including about eight carbon atoms; heterocyclic amines such as piperidine, morpholine, pyrrolidine, piperazine, and the lower-alkyl derivatives thereof, such as 1-methylpiperidine, 4-ethylmorpholine, 1-isopropylpyrrolidine, 1,4-dimethylpiperazine, 1-n-butylpiperidine, 2-methylpiperidine, 1-ethyl-2-methylpiperidine, mono-, di-, and triethanolamines, ethyldiethanolamine, n - butylmonoethanolamine, 2-amino-1-butanol, 2-amino-2-ethyl-1,3-propanediol, 2-amino-2-methyl-1-propanol, tris (hydroxymethyl) aminomethane, phenylmonoethanolamine, p-tertiaryamylphenyldiethanolamine, and galactamine, N-methylglucamine, N-methyl glycosamine, ephedrine, phenylephrine, epinephrine, procaine, and the like salts.

The novel compounds of this invention can be administered orally or parenterally in such dosage forms, tablets, injectables, and elixirs, as are commonly employed with central nervous system depressants. They can be combined with faster acting drugs such as pregnane-3,11,20-trione and 21-hydroxypregnane-3,20-dione hydrogen succinate, sodium salt, to give products having both immediate and prolonged action.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 11,20 - diketopregnane - 3 - spiro(2 - thiazolidine-4-carboxylic acid).
2. 11,20 - diketopregnane - 3 - spiro(2 - thiazolidine-4-carboxylic acid), sodium salt.
3. 11,20 - diketo - 5β - pregnane - 3 - spiro(2-thiazolidine-4-carboxylic free acid).
4. 11,20 - diketo - 5β - pregnane - 3 - spiro(2 - thiazolidine-4-carboxylic acid), sodium salt.
5. 11,20 - diketo - 5α - pregnane - 3 - spiro(2 - thiazolidine-4-carboxylic free acid).
6. 11,20 - diketo - 5α - pregnane - 3 - spiro(2 - thiazolidine-4-carboxylic acid), sodium salt.
7. A compound having the formula:

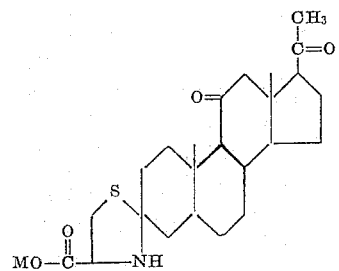

wherein M is a pharmacologically acceptable cation of a base.

No references cited.